US008936667B2

(12) United States Patent
Padayachee et al.

(10) Patent No.: US 8,936,667 B2
(45) Date of Patent: Jan. 20, 2015

(54) AQUEOUS LEACHING PROCESS FOR RECOVERY OF PRECIOUS METALS WITH ADDITION OF DI-THIOOXAMIDE LIGAND

(75) Inventors: Diandree Padayachee, Johannesburg (ZA); Makhosazane Chucky Kunene, Midrand (ZA); Marga Retha Burger, Johannesburg (ZA); Noko Simon Phala, Suideroord (ZA)

(73) Assignee: Anglo Operations Limited, Johannesburg (ZA)

( * ) Notice: Subject to any disclaimer, the term of this patent is extended or adjusted under 35 U.S.C. 154(b) by 323 days.

(21) Appl. No.: 13/386,019

(22) PCT Filed: Jul. 21, 2010

(86) PCT No.: PCT/IB2010/053325
§ 371 (c)(1),
(2), (4) Date: May 18, 2012

(87) PCT Pub. No.: WO2011/010289
PCT Pub. Date: Jan. 27, 2011

(65) Prior Publication Data
US 2012/0227545 A1 Sep. 13, 2012

(30) Foreign Application Priority Data
Jul. 21, 2009 (ZA) .................. 2009/05093

(51) Int. Cl.
*C22B 3/16* (2006.01)
*C07D 233/02* (2006.01)
*C22B 3/00* (2006.01)
*C22B 3/12* (2006.01)
*C22B 3/24* (2006.01)

(52) U.S. Cl.
CPC . *C22B 11/04* (2013.01); *C22B 3/12* (2013.01); *C22B 3/1616* (2013.01); *C22B 3/24* (2013.01)
USPC .............................. 75/722; 75/744

(58) Field of Classification Search
CPC ........ C22B 3/166; C22B 3/1616; C22B 3/12; C22B 3/24; C22B 11/04
USPC ..................... 75/744, 722
See application file for complete search history.

(56) References Cited

FOREIGN PATENT DOCUMENTS

CA 1214943 A * 12/1986
EP 1 964 936 9/2008

OTHER PUBLICATIONS

Chanda, M et al. "Polybenzimidazole Resin Based New Chelating Agents. Palladium (ii) and Platinum (IV) Sorption on Resin With Immobilized Dithiooxamide" Reactive Polymers 12 (1990) pp. 83-94.*

(Continued)

*Primary Examiner* — George Wyszomierski
*Assistant Examiner* — Tina M McGuthry Banks
(74) *Attorney, Agent, or Firm* — Ladas & Parry, LLP

(57) ABSTRACT

This invention relates to a process for the recovery of precious metal/s from a precious metal-containing material in an aqueous leach slurry or solution. The process includes the step of contacting the precious metal/s in the leach slurry or solution with a ligand selected from dithiooxamide (rubeanic acid), or a substituted dithiooxamide. The leaching of PGMs, gold and silver from their ores using the ligand of the present invention may take place under aqueous alkaline conditions, avoiding both corrosive acidic conditions and the use of cyanide.

34 Claims, 12 Drawing Sheets

(56) References Cited

OTHER PUBLICATIONS

Solozhenkin et al. "Collector for Sulphide Ore Flotation" SU 629984 A1. Published Oct. 30, 1978. Description in Russian and Machine Translation in English From Proquest Dialog.*

Van Poucke, et al., "A Potentiometric Study of the Water-Soluble Silver (I) Complexes of N,N'-BIS (2-Hydroxythyl) Dithiooxamide", Analytica Chimica Acta, Elsevier, Amsterdam, NL, vol. 42, Jan. 1, 1968, pp. 467-471.

Dutta, et al., "Preconcentration and separation of trace amounts of palladium using dithiooxamide functionalized chelating resin followed by its determination using radiotracer techinique", Journal of Radioanalytical and nuclear chemistry, Kluwer, Academic Publishers, vol. 274, No. 2, Jul. 10, 2007, pp. 245-250.

Whitcomb, et al. The thermal behavior of dithiooxamide ligands and their nickel complexes, Thermochimica Acta, Elsevier Science Publishers, Amsterdam, NL LNKD, vol. 167, No. 1, Sep. 30, 1990, pp. 111-113.

International Search Report for PCT/IB2010/053325 issued on Feb. 25, 2011.

Nilson and Monhemius. "Alternatives to cyanide in the gold mining industry: what prospects for the future." Journal of Cleaner Production, 14, 1158-1167, 2006.

Marsden, J. and House, I. "The chemistry of gold extraction." Ellis Horwood Limited, Chichester, UK. p. 77. 1992.

Robertson, S., et al., "An Introductory Electrochemical Approach to Studying Hydrometallurgical Reactions," Metal. Mater. Trans. B, 36B, 313-325, 2005.

Chapter I IPRP with Written Opinion for related PCT/IB2010/053325 dated Jan. 24, 2012.

Whitcomb, et al. "The thermal behavior of dithiooxamide ligands and their nickel complexes", Thermochimica Acta, Elsevier Science Publishers, Amsterdam, NL LNKD, vol. 167, No. 1, Sep. 30, 1990. pp. 111-121.

* cited by examiner ized equipment required to withstand corrosion in chloride leaching are just some of the reasons for the limited application of cyanide alternatives to gold leaching. These are discussed in detail in "*Alternatives to cyanide in the gold mining industry: what prospects for the future*", Hilson and Monhemius, *Journal of Cleaner Production*, 14, 1158-1167, 2006.

AQUEOUS LEACHING PROCESS FOR RECOVERY OF PRECIOUS METALS WITH ADDITION OF DI-THIOOXAMIDE LIGAND

CROSS-REFERENCE TO RELATED APPLICATIONS:

This application is the U.S. National Stage of International Patent Application No. PCT/IB2010/053325 filed on Jul. 21, 2010, which claims priority to South African Patent Application No. 2009/05093 filed on Jul. 21, 2009, the disclosures of which are hereby incorporated by reference in their entireties.

BACKGROUND OF THE INVENTION

This invention relates to the recovery of precious metals using leaching, in particular the leaching of precious metals, especially gold (Au), silver (Ag) and/or platinum group metals (PGMs), from ores, concentrates or tailings.

Current practice involves the use of cyanide (CN—) to leach gold from ores. While cyanide is (mostly) a very effective leach reagent for gold, it is also a very toxic chemical and a serious ecological threat. The negative environmental impact of cyanide spillages at several gold operations has raised concerns in recent years over the continued use of cyanide in gold operations.

Pressure to develop alternative processing routes for gold has led to investigations into a number of reagents. For various reasons, commercial application of these reagents to the gold industry has been slow. High reagent consumption in thiourea and thiosulphate leaching, the suspected carcinogenic properties of thiourea and the highly special- It is an object of this invention to provide a new process for the leaching of gold (Au), silver (Ag) and platinum group metal (PGM) ores, concentrates and tailings, which addresses the problems discussed above.

SUMMARY OF THE INVENTION

According to the invention there is provided a process for the recovery of precious metal/s from a precious metal-containing material in an aqueous leach slurry or solution, the process including the step of contacting the precious metal/s in the leach slurry or solution with a ligand selected from dithiooxamide (rubeanic acid), or a substituted dithiooxamide which is capable of chelating with precious metal/s and leaching precious metal/s into the leach solution or slurry.

"Precious metals" includes, gold (Au), silver (Ag) and platinum group metals (PGMs). PGMs include ruthenium, rhodium, palladium, osmium, iridium, and platinum.

The precious metal containing-material may be an ore, or any other material containing precious metal/s such as concentrates, tailings or recycled materials, as well as particulate gold, silver, or PGM's, or their molecular or elemental compounds, including natural ore minerals, metal powders, electronic scrap, jewelry scrap and other high value, high and low concentration starting materials.

Preferably, the leach solution or slurry is maintained at conditions which result in a deprotonation of the ligand.

The leach solution or slurry should be alkaline (i.e. pH above 7), and in the case of dithiooxamide preferably has a pH above 9, more preferably 10 or above, and up to 16.

The leach solution or slurry may be dosed with a base such as sodium hydroxide (NaOH) to maintain an alkaline medium.

The process may be carried out under ambient conditions, i.e. at atmospheric pressure, and at ambient a temperature, typically a temperature from 10 to less than 40° C., preferably from 20 to less than 40° C.

The ligand may be added at a concentration above the stoichiometric amount required for extraction of the precious metal/s and up to the solubility limit of the ligand. Typically, the ligand is added at a molar ratio of ligand to precious metal of 2:1 to 11000:1, preferably 60:1 to 800:1.

Preferably, the electrochemical potential (Eh) of the leach solution or slurry is controlled to be above 0 mV, more preferably above 40 and less than 200 mV, most preferably above 60 and less than 150 mV (SHE).

The Eh of the solution may be controlled by applying an oxidising agent which may be oxygen or oxygen containing gas such as air or a mixture of sulphur dioxide and oxygen alone (sparged into the leach solution), or oxygen in combination with another oxidising agent such as potassium permanganate or hypochlorite,or, less preferably, more aggressive gas mixtures, as may be made up using gases including chlorine or sulphur trioxide.

The ligand is preferably added to the slurry dissolved in an aqueous solution.

Dithiooxamide may be dissolved into the aqueous solution at a temperature below 40° C., typically 20 to below 40° C. and a pH above 13 up to 14, preferably from 13.5 to 14.

The process may be carried out in the presence of activated carbon where the precious metal/s, typically gold, is adsorbed onto the activated carbon.

A first embodiment of the invention relates to the recovery of gold from ore, concentrates or tailings.

In this process, the pH of the leach or slurry solution is preferably from 10 to 15, more preferably 12 to 14; and the process is preferably carried out at a temperature from 20 to less than 40° C., preferably 20 to 30° C.

In a process for leaching gold from ore, concentrates or tailings, the ligand concentration in the leach solution or slurry may be from 0.002 to 12 g/l, typically the ligand concentration may be at a ratio of 0.1 to 1 g/l ligand per mg/g gold, for example: from 0.1 to 1 g/l for a gold concentration of 1 mg/g of ore, concentrates or tailings.

In a process for leaching precious metal/s from ore, concentrates or tailings, oxygen may be sparged at a flow rate of 1-4 l/min, preferably 2-3 l/min for a solids concentration of between 100 g/l and 300 g/l.

A second embodiment of the invention relates to the recovery of silver, PGMs, or PGMs and gold and/or silver from ores, concentrates or tailings.

In this process, the pH of the leach slurry or solution is preferably from 10 to 14, most preferably from 10.5 to 13, and the process may be carried out at a temperature from 20 to less than 70° C.

In a process for leaching silver, PGMs, or PGMs and gold and/or silver from ore, concentrates or tailings, the ligand concentration in the leach solution or slurry may be from 0.001 to 36 g/l, typically the ligand concentration may be at a ratio of 0.02 to 0.4 g/l ligand per mg/g silver, PGMs, or PGMs and gold and/or silver, for example: from 0.1 to 2 g/l for a silver, PGM or PGM and gold and/or silver concentration of 5.3 mg/g of ore, concentrates or tailings.

A third embodiment of the invention relates to the recovery of precious metal/s in elemental form from a leach slurry or solution, for example gold, silver or PGMs from recycling, electronic scrap, jewelry scrap.

In this process, the pH of the leach or slurry solution could be from 10 to 15.

In a process for leaching elemental gold, silver and/or PGMs, for example from recycling, electronic scrap, jewelry scrap, the ligand concentration in the leach solution may be from 0.002 to 12 g/l, typically the ligand concentration may be at a ratio of 0.1 to 1 g/l ligand per mg/g elemental gold, silver and/or PGMs, for example: from 0.1 to 1 g/l, for a elemental gold, silver and/or PGM concentration of 1 mg/g.

The substituted dithiooxamide ligand may be selected from:

Formula 1:

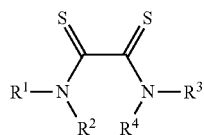

where $R^{1,2,3,4}$ may, independently, be selected from —H, alkyl, substituted alkyl, aryl, or substituted aryl; preferably —H, —COOH, —CH$_2$COOH, or —(CH$_2$)$_2$SO$_3$H; or Formula 2:

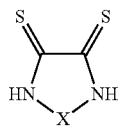

where X may be selected from —CO—, —CS—, —CH$_2$—, —O—, —S—, —CH=CH—, or —NH—; or Formula 3

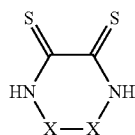

where X may be selected from —CO—, —CS—, —CH$_2$—, —O—, —S—, or —NH—.

By "independently", it is meant that although one or more of the R groups may be the same, there is no requirement that they are all the same.

The invention also relates to a ligand selected from dithiooxamide (rubeanic acid), or a substituted dithiooxamide for use in a process as described above.

The invention further relates to a method for dissolving dithiooxamide into an aqueous solution, wherein the solution is at a temperature below 40° C., typically 20 to below 40° C. and a pH above 13 up to 14, preferably from 13.5 to 14, and dithiooxamide is added to the solution.

DETAILED DESCRIPTION OF THE INVENTION

Figure 1:
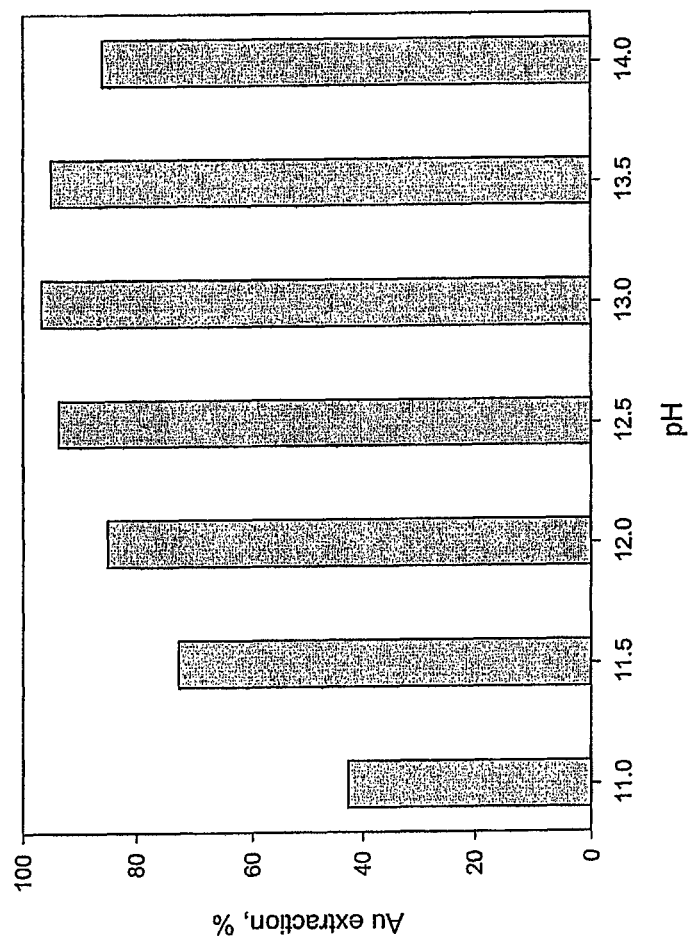
FIG. 1 is a graph showing the effect of leach pH on gold extraction (25° C., 24 h, O$_2$, 0.9 g/l DTO)

This invention relates to the recovery of precious metals using leaching, in particular the leaching of precious metals, especially, gold (Au), silver (Ag) and/or platinum group metals (PGMs) from ores, and also to the recovery of precious metals from other feed materials such as concentrates, tailings or recycled materials, as well as particulate gold, silver, or PGM's, or their molecular or elemental compounds, including natural ore minerals, metal powders, electronic scrap, jewelry scrap and other high value, high concentration starting materials.

During the recovery of precious metals from ores, a precious-metal containing ore is comminuted to produce a comminuted ore feed material. Comminution may be by any known technique, such as by wet or dry crushing followed by wet or dry grinding. Water is added to the comminuted precious-metal containing ore to produce a slurry with a concentration of 10 to 50, typically 15 to 30% ore, by weight.

According to an aspect the present invention, precious metals, especially, gold (Au), silver (Ag), and/or platinum group metals (PGMs) are recovered from the slurry of comminuted ore or in a leaching process in which the comminuted ore is contacted in a leach solution or slurry with ligand selected from dithiooxamide (rubeanic acid) or a substituted dithiooxamide ligand which is capable of chelating with the precious metal/s in the ore and leaching the precious metal/s into the leach solution or slurry, in the presence of an oxidiser.

Typically, a process for the recovery of precious metals according to the invention includes the following steps:
- the ligand is dissolved into an aqueous solution and added to an aqueous leach solution or slurry;
- the leach solution/slurry is contacted with the feed material, such as a comminuted ore, metal scrap, or salts in a stirred jacketed reactor or leach column, or heap leach pad, for the required length of time for the precious metal/s to complex with the ligand, with adequate pH control and adequate supply of an oxidant, e.g. by oxygen sparging; and
- at the end of the leach period, a leach slurry or solution is filtered and the solid residue may be washed under filtration several times to remove any entrained dissolved metal ions.

In the filtration and washing steps, any leached metals are recovered from the ore into the filtrate solution.

Precious metal/s may be recovered from the leachate by means known to those skilled in the art, such as adsorption onto activated carbon, cementation onto a metal such as zinc, reductive precipitation with e.g. sulphur dioxide gas, electrowinning, ion exchange or solvent extraction.

Dithiooxamide (rubeanic acid) does not have good solubility in water, and was therefore considered unsuitable for leaching of precious metals. According to the present invention, however, it has surprisingly been found that dithiooxamide can be used as such a ligand when in its deprotonated forms (i.e. the conjugate bases of dithiooxamide). Dissolution levels of above 90% have been achieved within twenty four hours in an aqueous alkaline medium.

According to the present invention, it has been found that dithiooxamide can be dissolved into water at a temperature below 40° C., typically a temperature of 20 to below 40° C., and at a high pH of above 13 to 14, typically 13.5 to 14.

It has also been found that dithiooxamide can be successfully dissolved into a leach slurry or solution in a leaching process and successfully used in the leaching of gold, silver and PGM from ores, concentrates or tailings. An investigation into this process suggests the maximum thermodynamic stability of the product, coupled with the minimum stability of the reactants, results in an optimised negative free energy for the reaction.

In accordance with an embodiment of the present invention, the leach solution/slurry is contacted with the precious metal bearing solid material, such as a comminuted ore, in a suitable arrangement, such as a stirred tank reactor, leach column, or heap leach pad for the required length of time for the precious metal/s to complex with the ligand, with adequate pH control in the range of 12 to 14 (by, for example, dosing the leach solution with sodium hydroxide (NaOH)). Highest gold extractions are obtained at a leach temperature from 20° C. to below 40° C. Higher leach temperatures (40° C. and above) cause significantly lower gold extractions. The concentration of ligand used will depend on the type of ore. Gold extractions increase with ligand concentration, and the ligand concentration may be anywhere between the stoichiometric amount required for leaching gold and the ligand solubility limit. Generally, the ligand concentration will be from 0.1 to 1 g/l, preferably from 0.3 to 0.9 g/l. The oxidising agent may be oxygen alone (sparged into the leach solution at a flow rate of 2-3 l/min, for a solids concentration of between 100 g/l and 300 g/l), or oxygen in combination with another oxidising agent such as potassium permanganate, or an oxygen bearing gas mixture, or, less preferably, more aggressive gas mixtures, as may be made up using gases including chlorine or sulphur trioxide The oxidising agent is applied to control the electriochemical potential (Eh) of the solution to above 0 mV, preferably above 40 and less than 200 mV, most preferably above 60 and less than 150 mV (SHE).

Tests have shown that the dithiooxamide ligand is selective for gold and other precious metals over the other constituents of the ore, such as aluminium (Al), cerium (Ce), iron (Fe), silicon (Si), uranium (U) and copper (Cu).

At the end of the leach period, a leach slurry or solution is filtered and the solid residue may be washed under filtration several times to remove any entrained dissolved metal ions. Gold may then be recovered from the leachate by adsorption onto activated carbon, or by other means known to those skilled in the art, such as cementation onto a metal such as zinc, reductive precipitation with e.g. sulphur dioxide gas, electrowinning, ion exchange or solvent extraction.

If desired, gold leached with dithiooxamide could be adsorbed onto activated carbon. Greater concentrations of activated carbon results in faster extraction of the gold complex from the leach liquor.

Although the above process has been described in detail with respect to recovering gold from ore, persons skilled in the art would understand that the ligand of the invention may be used successfully for leaching other precious metals including, silver (Ag) and/or platinum group metals (PGMs) from ores, and also to the recovery of precious metals from other feed materials such as concentrates, tailings or recycled materials, as well as particulate gold, silver, or PGM's, or their molecular or elemental compounds, including natural ore minerals, metal powders, electronic scrap, jewelry scrap and other high value, high concentration starting materials.

Specific leaching conditions will depend on the precious metal/s being recovered and the type of feed material. For example:
- where the precious metal/s is gold from ore, concentrates or tailings, the pH is preferably from 10 to 15, more preferably 12 to 14, most preferably 12.5 to 14;
- where the precious metal/s is silver from ores, concentrates or tailings, the pH should be greater than 7;
- where the precious metal/s is PGM/s from ores, concentrates or tailings, the pH is preferably from 10 to 14, most preferably from 10.5 to 13.
- where the precious metes is/are in elemental form, for example gold, silver or PGMs from electronic scrap, jewelry scrap, the pH could be from 10 to 14.

Derivatives of dithiooxamide which may be used as a ligand in the process of the present invention may be selected from:

Formula 1:

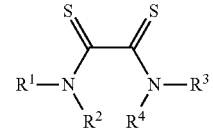

where $R^{1,2,3,4}$ may, independently, be selected from —H, alkyl, substituted alkyl, aryl, or substituted aryl; preferably —H, —COON, —CH$_2$COOH, or —(CH$_2$)$_2$SO$_3$H; or Formula 2:

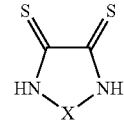

where X may be selected from —CO—, —CS—, —CH$_2$—, —O—, —S—, —CH=CH—, or —NH—; or

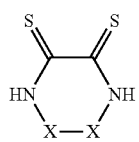

Formula 3 where X may be selected from —CO—, —CS—, —CH$_2$—, —O—, —S—, or —NH—

By "independently", it is meant that although one or more of the R groups may be the same, there is no requirement that they are all the same.

In the case where the ligand is substituted dithiooxamide, the leach solution or slurry may have a pH in the range of 7-14

Advantages of the present invention include:

Potential low toxicity and chemically effective ligands, for extraction of PGMs, gold and silver from their ores.

The leaching of PGMs, gold and silver from their ores using the ligands of the present invention may take place under aqueous alkaline conditions, avoiding both corrosive acidic conditions and the use of cyanide for gold ores.

The easy elimination of ligand from waste solution by adjustment of effluent liquors to broadly neutral pH ranges, under which conditions the solubility of the ligand is extremely low.

The ligand of the present invention is selective for gold, silver and PGMs over the other constituents of the ore, such as aluminium (Al), cerium (Ce), iron (Fe), silicon (Si), uranium (U) and copper (Cu).

The present invention will now be described in more detail in the following non-limiting examples.

EXAMPLES

Example 1

Leaching of Gold Ore

The standard test conditions for leaching of a gold ore were as follows:

A dilute alkaline dithiooxamide solution (7.6E-03 M) was used to leach 110 g of Witwatersrand gold ore in a stirred, jacketed reaction vessel. The solids concentration in the leach was initially 17%. The temperature of the leach was maintained at 25° C. and 4 M NaOH was dosed in to maintain the leach alkalinity to a pH of ~13. Oxygen was sparged into the leach solution at a flowrate of 2 l/min. Leaching was carried out for 24 h.

Analysis of the washed leach residues showed that dithiooxamide extracted most of the gold from the ore within 24 h. Dithiooxamide was also selective for gold over the other major components in the ore (Table 1).

TABLE 1

Chemical analysis of gold leach residues

| Ligand; purity | Final pH | Final Eh (vs SHE), mV | Metal Extraction, % | | | | | |
|---|---|---|---|---|---|---|---|---|
| | | | Al | Au | Ce | Fe | Si | U |
| DTO; 98.0% | 13.6 | 61.9 | 16 | 91 | 4.1 | <0.05 | 5.7 | 3.7 |
| DTO; 98.5% | 13.3 | 60.9 | 11 | 97 | <0.00005 | <0.05 | 11 | 4.3 |

Example 2

Leaching of Witwatersrand Gold Ore

Below are examples of leaches that were carried out on a Witwatersrand gold ore. A typical chemical analysis of the one is shown in Table 2.

TABLE 2

Chemical analysis of ore used in gold leach test work

| Al, % | Au, g/t | Ce, ppm | Fe, % | Si, % | U, ppm |
|---|---|---|---|---|---|
| 3.8 | 8.7 | 70.0 | 2.8 | 37 | 344.0 |

A head sample was submitted with every batch of samples in order to minimise errors caused by discrepancies in analysis among batches. The metal extractions for a particular batch of samples were therefore calculated using the head sample analysis from the same batch.

Deionised water was used in all preparation, dissolution, leach and washing steps.

The leach procedure was as follows:

The required amounts of ligand and alkaline water were mixed in a jacketed leach reactor until the ligand was fully dissolved. The ore was then added to the solution (unless otherwise specified, initial solids concentration was 17% m/m) and the reactor lid was fitted on. A stirring impeller, pH and (Ag/AgCl) redox electrodes, titration dispensing tube, temperature probe and gas distribution tube (if oxygen was used) were fitted into ports in the lid. The ore was then leached for the required amount of time. A water bath was used to maintain the leach temperature for the duration of the leach. The leach pH was controlled with an autotitrator. If oxygen was the oxidant, a mass flow controller was used to control oxygen-flow into the solution. At the end of the leach period, the slurry was filtered and the residue was given at least two water washes using water of the same pH as the leach solution, followed by a final wash with deionised water. The leach filtrate, wash solutions and dried solid residue were then submitted for analysis.

Example 2A

Leach pH

The DTO ligand is only soluble in an aqueous medium if it is in a singly or doubly deprotonated form. Investigations into the effect of leach pH could therefore only be carried out from pH 11 (pKa of DTO), upwards. Results showed that >90% gold extraction could often be achieved in the pH 12-14 range while significantly lower extractions were obtained between pH 11-12 (FIG. 1).

Prior to the leach, the ligand is dissolved in water which has been pre-adjusted to the leach pH. It was observed that the ligand dissolved far more readily at pH 13.5 to 14, than at pH 11 to 13. In addition, the dissolved DTO solutions at pH 13.5 or 14 were pale green in colour as opposed to the orange colour of the DTO solutions at pH values less than 13.5. It was suspected that the ligand became doubly deprotonated at pH 13.5 and above.

Example 2B

Leach Temperature

Figure 2:
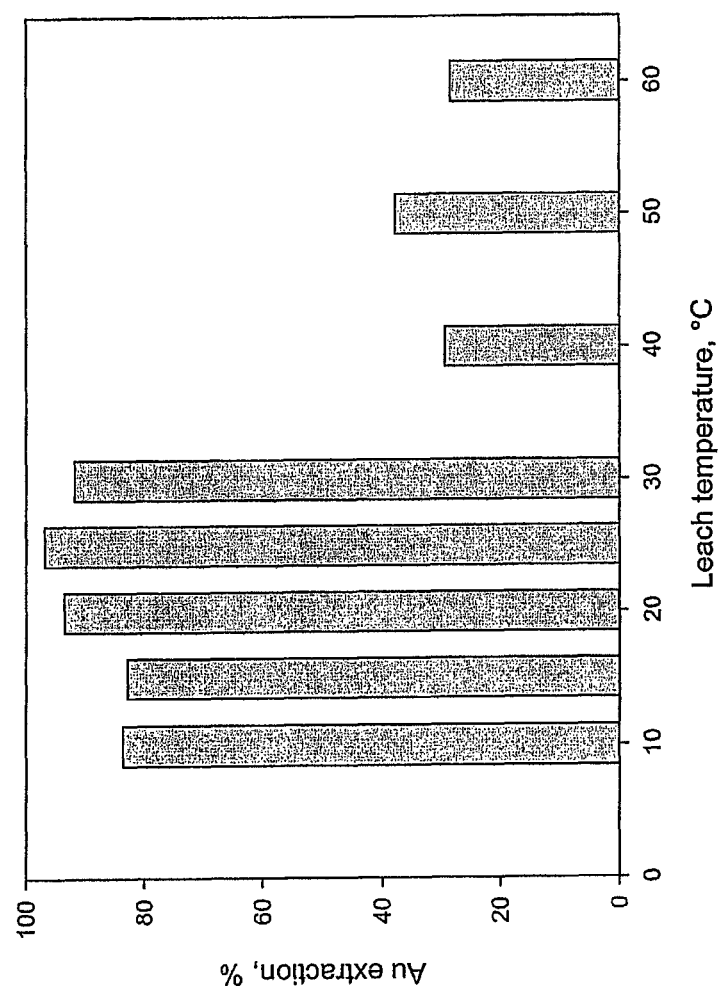
FIG. 2 is a graph showing the effect of leach temperature on gold extraction (24 h, pH 12 control, O$_2$, 0.9 g/l DTO)

Leach temperature comparisons (FIG. 2) shows that the highest gold extractions were obtained at ambient temperature. Higher leach temperatures (≥40° C.) caused significantly lower gold extractions.

Example 2C

Ligand Concentration

Stoichiometrically, a ligand concentration of 2.4E-03 g/l DTO is required for gold extraction from the ore used in the example. However, in reality, it is expected that there may be other components in the ore which would consume some of the ligand and therefore more than just the stoichiometric quantity of ligand would be necessary.

Figure 3:
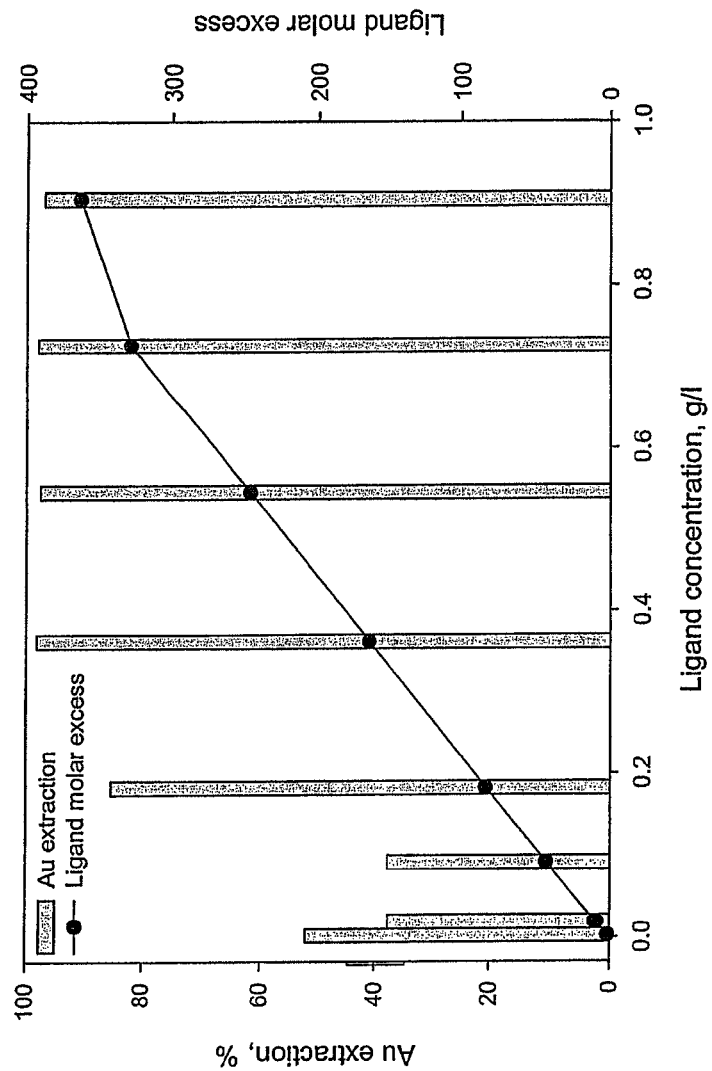
FIG. 3 is a graph showing the effect of ligand concentration on gold extraction (25° C., 24 h, pH 13.5, O$_2$)

Various concentrations of DTO, ranging from the stoichiometric amount (2.4E-03 g/l) to the approximate solubility limit of DTO in aqueous pH 12 solution (0.9 g/l), were therefore tested in otherwise identical gold leaches. The gold extractions are shown in FIG. 3.

Gold extractions were observed to increase with increasing ligand concentration. Over 90% of the gold was extracted into solutions containing a 0.38 g/l DTO. However, this equated to a ligand molar excess of over 150. While still maintaining the selectivity of gold over other major components in the ore.

Example 2D

Oxygen Concentration

Figure 4:
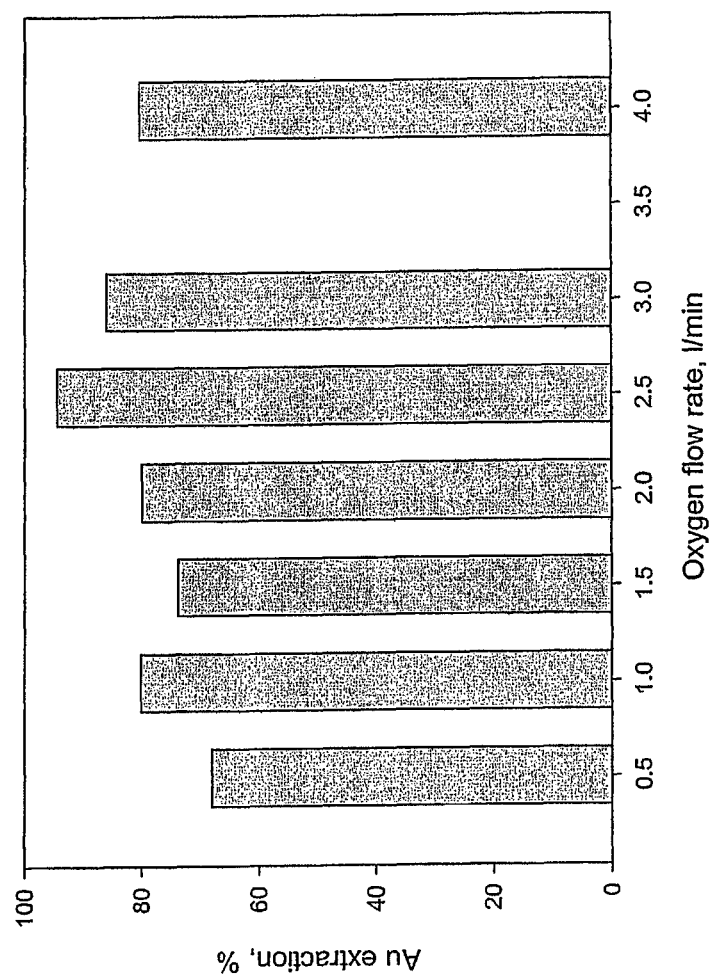
FIG. 4 is a graph showing the effect of oxygen flow rate on gold extraction for a solids concentration of between 113 g/l and 255 g/l. (25° C., 24 h, pH 12 control, 0.9 g/l DTO)

Initial results from the influence of oxygen flow rate on gold extraction, are shown in FIG. 4.

It appears from the figure that the highest (>90%) gold extractions was achieved at oxygen flow rates of 2.5 to 3 l/min. It also appears that at oxygen flow rates below 2.5 l/min and above 3 l/min result in thermodynamically and/or kinetically less favourable conditions for extraction of gold extractions.

Example 2E

Leach Time

Tests were carried out to determine the effect of leach time on gold extraction. During the course of investigations, it was observed that gold extractions of >90% were most often obtained when the solution Eh was above 60 mV (vs SHE). Two tests were therefore carried out (initial solids concentration=20%):

Using oxygen alone as an oxidant. Oxygen was sparged into the leach solution at a flow rate of 3 l/min.

Using a combination of oxygen and potassium permanganate to force the solution Eh to above 60 mV (vs SHE).

Figure 5:
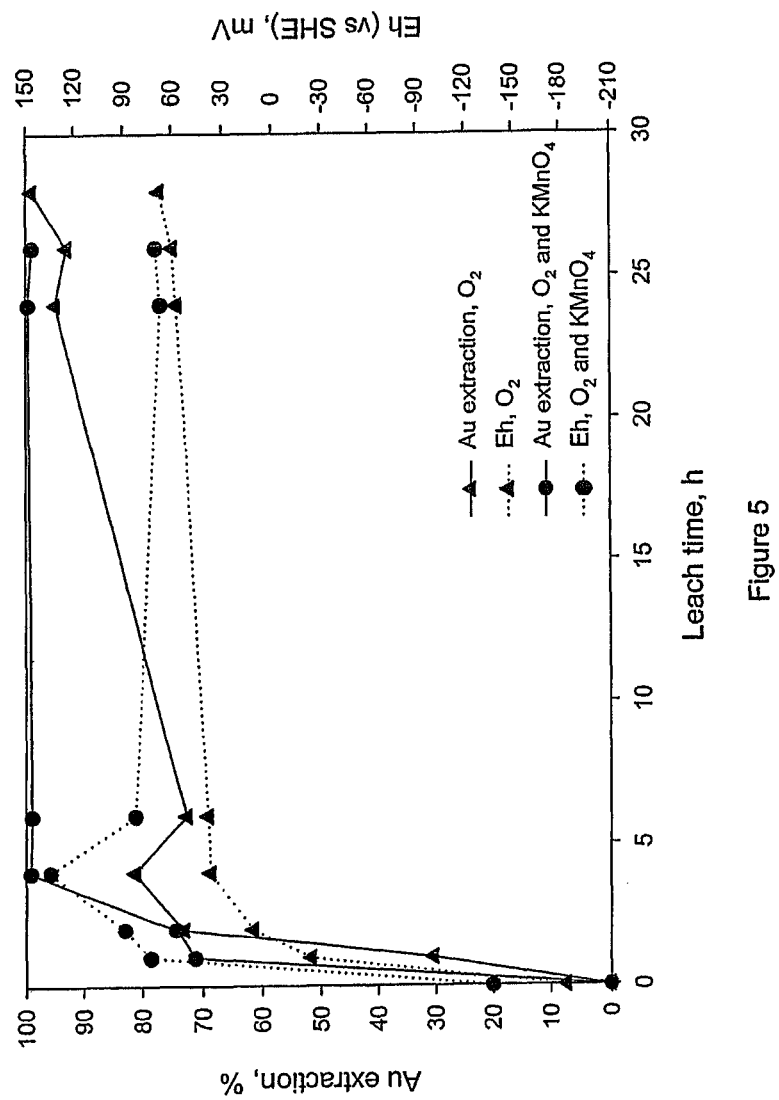
FIG. 5 is a graph showing kinetic curves for gold extraction using oxygen alone (solid red curve), or a combination of oxygen and potassium permanganate (solid green curve), as oxidants. Dotted lines show corresponding solution Eh values (25° C., 0.9 g/l DTO, O$_2$ flow rate of 3 l/min for a solids concentration of between 113 g/l and 255 g/l)

The results of the two leaches are shown in FIG. 5.

The combination of oxygen/permanganate used to push the Eh above 60 mV, resulted in maximum gold extraction after only 4 h of leaching.

On the other hand, the use of oxygen alone led to a gradual increase in Eh and a correspondingly gradual increase in gold extraction. Greater than 90% gold extraction was only seen in the 24 h sample. It is possible this was obtained earlier but no samples were taken between 6 and 24 h. The corresponding Eh values for the 24-, 26- and 28-h samples were at ~60 mV.

The drop in gold extraction between 4- and 6-h for the oxygen-only leach could be due to analytical variations or preg-robbing phases. Witwatersrand gold ores contain carbonaceous materials, pyrophyllite and shale—all of which have preg-robbing characteristics [J. Marsden, I. House, *The chemistry of gold extraction*, Ellis Horwood Limited, Chichester, UK, p 77, 1992]. Since preg-robbing is readily reversible from these phases, it is possible (if analytical error is discounted) that the drop and subsequent increase in gold extractions from 4- to 6- to 24-h could be due to this phenomenon.

The length of time that it takes for the Eh to increase in the oxygen-only leach is most probably due to the diffusion-limitations of oxygen in the gold-DTO leach system. Oxygen diffusion is also the limiting factor in the gold-cyanide system [S. Robertson, et al., Metal. Mater. Trans. B, 36B, 313-325, 2005].

Example 3

Gold-ligand Adsorption on Activated Carbon

Figure 6:
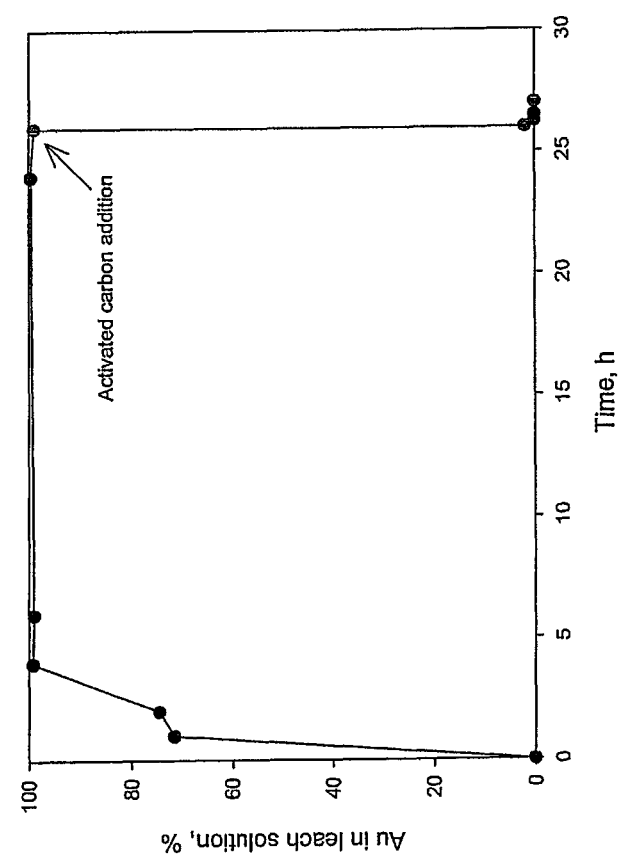
FIG. 6 is a graph showing a kinetic curve for gold extraction (oxygen/permanganate leach) and subsequent adsorption on to activated carbon.

Following the oxygen/permanganate kinetic leach depicted in FIG. 6, an excess (153 g/l) of Chemquest CQ 650™ activated carbon, was added into the leach slurry at 26 h. Solution samples were taken at intervals and analysed by AAS.

The first sample was taken 15 min after addition of the activated carbon. Analysis of the sample showed that 100% adsorption of the gold-DTO complex on to activated carbon occurred within that period of time (FIG. 6)

This experiment proved that the leached gold could be adsorbed onto activated carbon.

Figure 7:
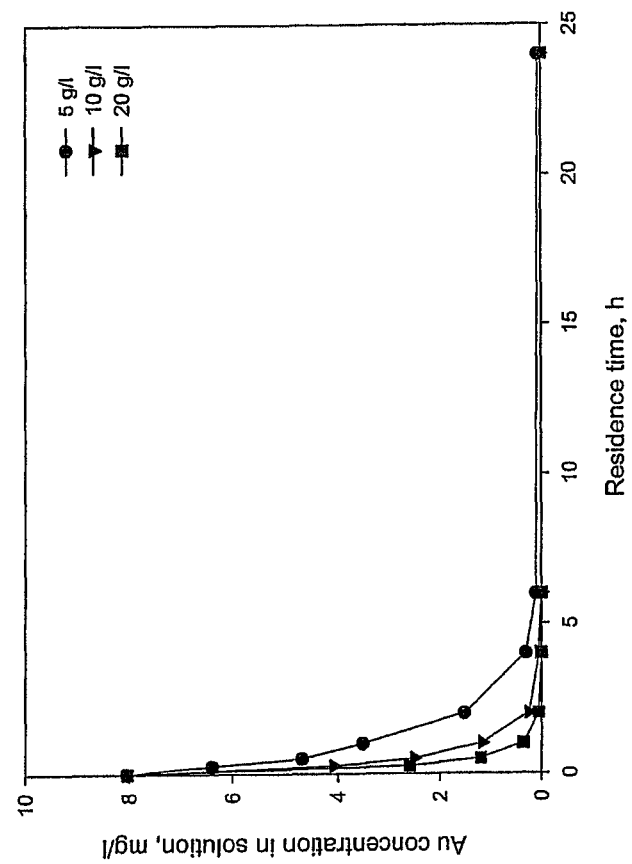
FIG. 7 is a graph showing the concentration of the gold complex extracted from the leach solution over time, at different concentrations of activated carbon.

Further experiments were performed where the concentration of activated carbon were varied. As is clear from FIG. 7, these experiments confirm that the leached gold is adsorbed onto activated carbon. It also illustrated than greater concentrations of activated carbon results in faster extraction of the gold complex from the leach liquor.

Example 4

Leaching of a PGM Concentrate

Example 4A

Leaching of Pt and Pd

The use of the DTO ligand on the extraction of Pt and Pd from a PGM concentrate was investigated on two different samples: concentrate 1 and concentrate 2. The grade of the two concentrates is shown in Table 3.

TABLE 3

Chemical analysis of the PGM concentrates

| Sample | Au, g/t | Pd, g/t | Pt, g/t | Ag, g/t |
|---|---|---|---|---|
| Concentrate 1 | 13 | 27 | 25 | 10 |
| Concentrate 2 | 14 | 27 | 22 | 13 |

Under leach conditions of 1 g/l DTO, 25° C. and 24 h leach time, almost 40% Pt was extracted from concentrate 1. The extractions were found to be reproducible (Table 4).

TABLE 4

Experimental results of the Pt, Pd and Au extractions in DTO leach using concentrate 1

| Repeat | Metal extractions, % | | |
|---|---|---|---|
| | Pt | Pd | Au |
| 1 | 37 | 27 | 38 |
| 2 | 38 | 28 | 21 |
| 3 | 37 | 24 | 28 |

Figure 8:
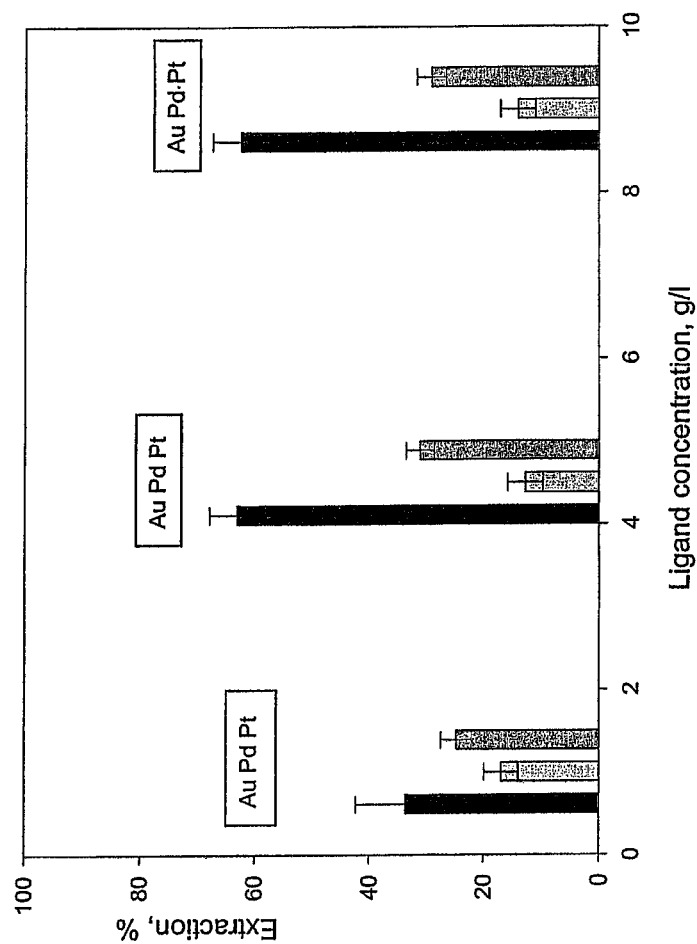
FIG. 8 is a graph showing the effect of DTO concentration on Pd, Pt and Au extractions from concentrate 1. (25° C., 48 h, pH 12.5, O$_2$ flow rate of 1 l/min) at a solids concentration of between 190 g/l and 266 g/l.

Tests carried out on concentrate 1 are shown in FIG. 8 as a function of ligand concentration. From the figure it is shown that as the DTO ligand concentration increase the extraction of Au and Pt increase. However the extraction of Pd decreases slightly with increasing ligand concentration.

Figure 9:
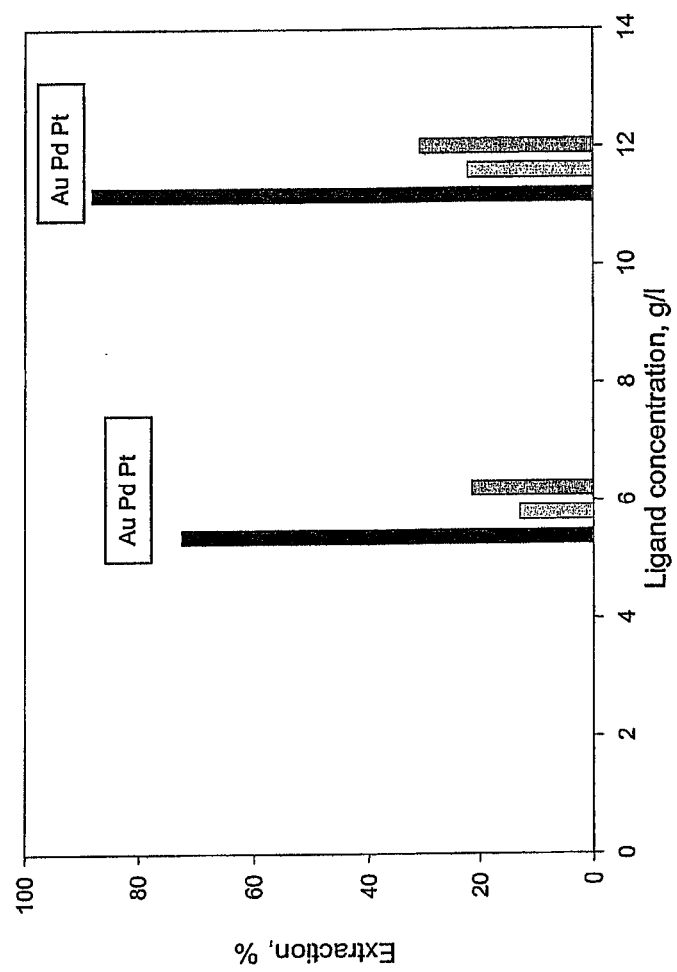
FIG. 9 is a graph showing the effect of DTO concentration on Pd, Pt and Au extractions from concentrate 2. (25° C., 48 h, pH 12.5 O$_2$ flow rate of 2 l/min) at a solids concentration of between 109 g/l and 131 g/l.

Similar tests were carried out on concentrate 2. FIG. 9 shows that with increasing DTO concentration from 5.8 to 11.6 g/l the extraction of Pt, Pd and Au increased.

From the data presented in FIG. 8 and FIG. 9, it can be concluded that the extraction of PGM is dependent on the DTO ligand concentration, however the effective DTO ligand concentration is dependant on the PGM mineralogy of the concentrate or ore.

Figure 10:
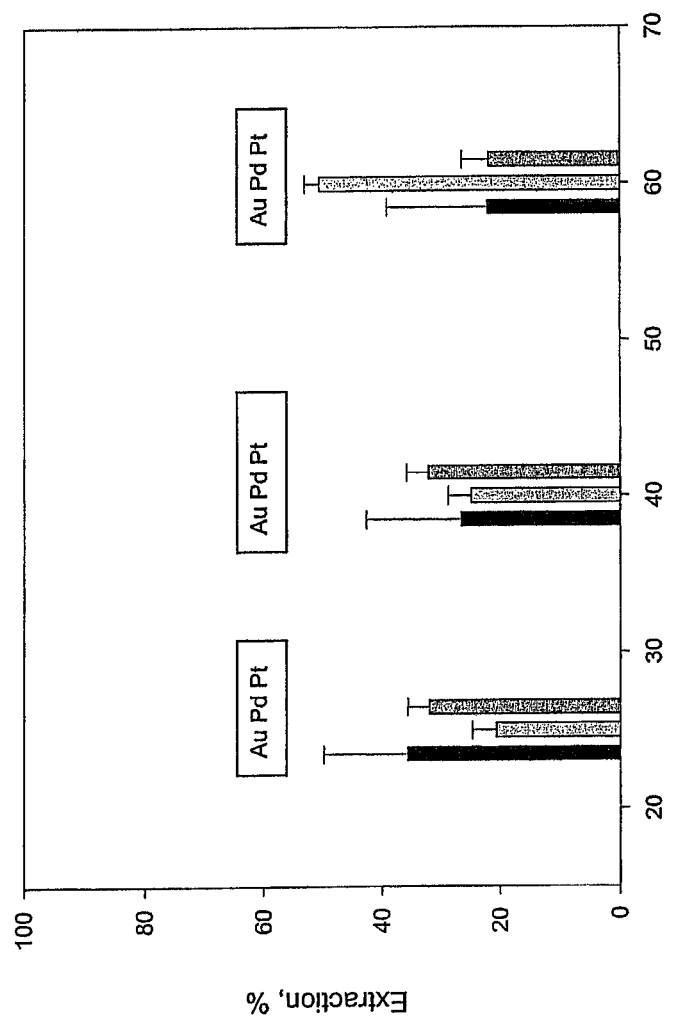
FIG. 10 is a graph showing the effect of leach temperature on the precious metal extraction from concentrate 1. (1 g/l DTO, 24 h, pH 12.5, O$_2$ flow rate of 2 l/min) at a solids concentration of between 190 g/l and 266 g/l.

The effect of temperature on the extraction of Au, Pd and Pt is shown in FIG. 10 in combination of the addition of the DTO ligand. From the figure it is shown that an increase in leach temperature has a negative effect on the extraction of Au and Pt from concentrate 1. However the Pd extraction increases significantly with the increase in leach temperature.

Figure 11:
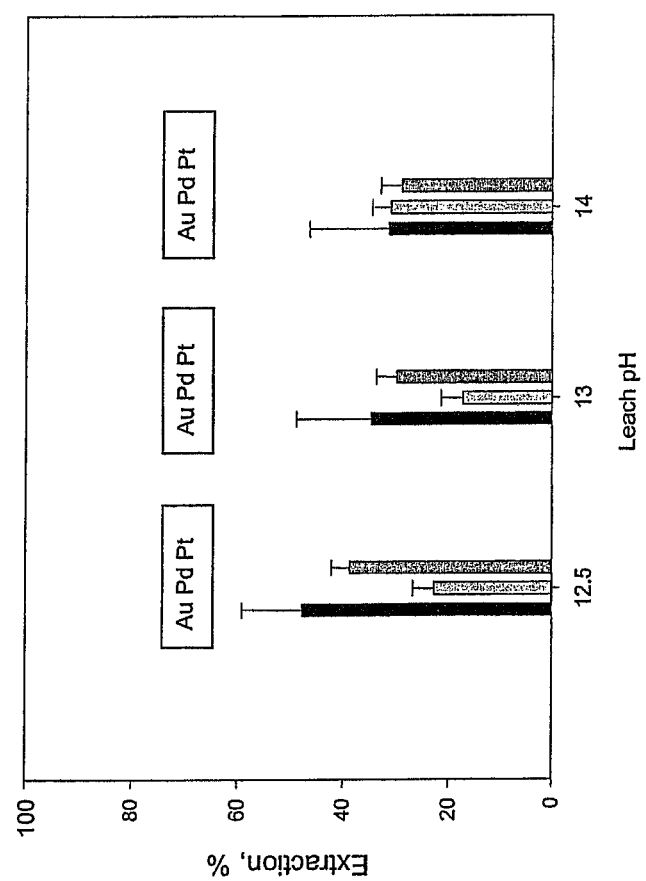
FIG. 11 is a graph showing the effect of leach pH on the precious metal extraction from concentrate 1. (25° C., 1 g/l DTO, 24 h, O$_2$ flow rate of 2 l/min) at a solids concentration of between 190 g/l and 266 g/l.

FIG. 11 shows the effect of leach pH on the extraction of Au, Pd and Pt from concentrate 1 with the addition of the DTO ligand. With an increase in leach pH the extraction of Au and Pt decrease but the extraction of Pd increase with an increase in pH.

Example 4B

Leaching of Ag

Figure 12:
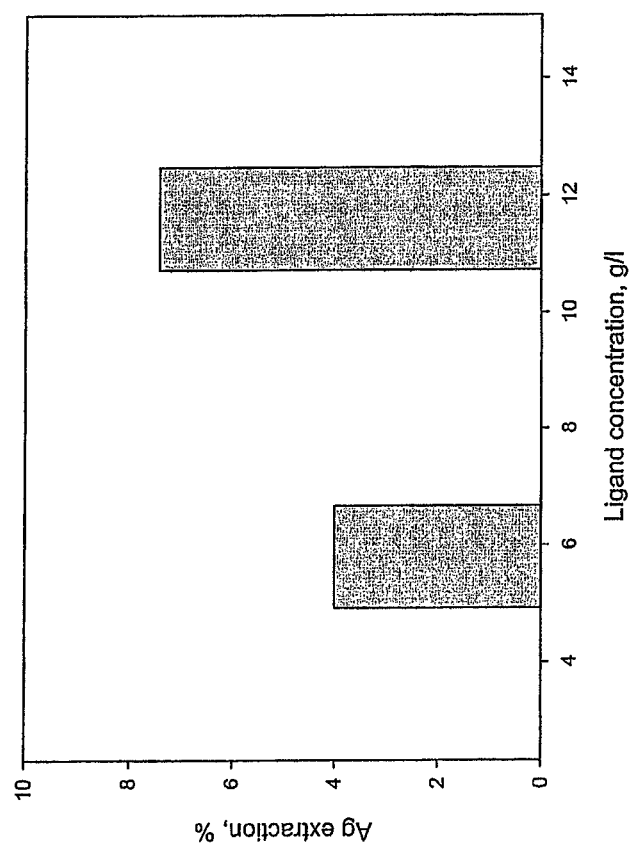
FIG. 12 is a graph showing the effect of DTO on the extraction of Ag from Concentrate 2 as a function of DTO ligand concentration (25° C., 48 h, O$_2$ flow rate of 2 l/min) at a solids concentration of between 109 g/l and 131 g/l.

The influence of the DTO ligand on the extraction of Ag from the PGM concentrate 1 is shown in FIG. 12. From the figure it is seen that as the DTO ligand concentration increase so does the amount of Ag extracted from the PGM concentrate.

The invention claimed is:

1. A process for the recovery of precious metal/s from a precious metal-containing material in an aqueous leach slurry or solution, the process including a step of contacting the precious metal/s in the leach slurry or solution with a ligand,
 wherein the ligand is dithiooxamide, or substituted dithiooxamide, and
 wherein the leach solution or slurry is maintained at conditions which result in a deprotonation of the ligand.

2. A process as claimed in claim 1, wherein a pH of the leach solution or slurry is above 7.

3. A process as claimed in claim 1, wherein the ligand is dithiooxamide.

4. A process as claimed in claim 3, wherein a pH of the leach or slurry solution is above 9.

5. A process as claimed in claim 4, wherein the pH of the leach or slurry is 10 or above.

6. A process as claimed in claim 1, wherein the ligand is added at a concentration above a stoichiometric amount required for extraction of the precious metal/s and up to a solubility limit of the ligand.

7. A process as claimed in claim 1, wherein the ligand is added at a molar ratio of ligand to precious metal/s of 2:1 to 11000:1.

8. A process as claimed in claim 7, wherein the ligand is added at a molar ratio of ligand to precious metal/s of 60:1 to 800:1.

9. A process as claimed in claim 1, wherein an electrochemical potential (Eh) of the leach solution or slurry is controlled to be above 0 mV versus a Standard Hydrogen Electrode (SHE).

10. A process as claimed in claim 9, wherein the electrochemical potential (Eh) of the leach solution or slurry is controlled to be above 40 and less than 200 mV.

11. A process as claimed in claim 10, wherein the electrochemical potential (Eh) of the leach solution or slurry is controlled to be above 60 and less than 150 mV.

12. A process as claimed in claim 1, wherein the ligand is added to the slurry dissolved in an aqueous solution.

13. A process as claimed in claim 12, wherein the ligand is dithiooxamide which is dissolved into the aqueous solution at a temperature below 40° C., and a pH above 13 up to 14.

14. A process as claimed in claim 13, wherein the ligand is dithiooxamide which is dissolved into the aqueous solution at a temperature from 20 to below 40° C. and a pH from 13.5 to 14.

15. A process as claimed in claim 1, wherein the leach slurry or solution is contacted with activated carbon and the precious metal/s is/are adsorbed onto the activated carbon.

16. A process as claimed in claim 1, wherein the precious metal is gold and the precious metal-containing material is ore, concentrates or tailings.

17. A process as claimed in claim 16, wherein a pH of the leach or slurry solution is from 10 to 15.

18. A process as claimed in claim 17, wherein the pH of the leach slurry or solution is 12 to 14.

19. A process as claimed in claim 18, wherein a temperature of the leach slurry or solution is from 20 to less than 40° C.

20. A process as claimed in claim 19, wherein the temperature of the leach slurry or solution is from 20 to 30° C.

21. A process as claimed in claim 16, wherein the a ligand concentration in the leach solution or slurry is from 0.002 to 12 g/l.

22. A process as claimed in claim 16, wherein a ligand concentration in the leach solution or slurry is at a ratio of 0.1 to 1 g/l ligand per mg/g gold.

23. A process as claimed in claim 1, wherein the precious metal/s is/are selected from the group consisting of silver, PGMs, PGMs and gold, PGMs and silver and PGMs and gold and silver, and the precious metal-containing material is selected from the group consisting of ore, concentrates and tailings.

24. A process as claimed in claim 23, wherein a pH of the leach slurry or solution is from 10 to 14.

25. A process as claimed in claim 24, wherein the pH of the leach or slurry is from 10.5 to 13.

26. A process as claimed in claim 23, wherein a temperature of the leach solution or slurry is from 20 to less than 70° C.

27. A process as claimed in claim 23, wherein a ligand concentration in the leach solution or slurry is from 0.001 to 36 g/l.

28. A process as claimed in claim 23, wherein a ratio of a concentration of ligand in the leach slurry or solution, in g/l, to a concentration of silver, PGMs, PGMs and gold, PGMs and silver, or PGMs and gold and silver in the leach slurry or solution, in mg/g, is 0.02 to 0.4.

29. A process as claimed in claim 1, wherein the precious metal/s are in elemental form.

30. A process as claimed in claim 29, wherein a pH of the leach or slurry solution is from 10 to 15.

31. A process as claimed in claim 29, wherein a ligand concentration in the leach solution us from 0.002 to 12 g/l.

32. A process as claimed in claim 29, wherein a ligand concentration in the leach solution is at a ratio of 0.1 to 1 g/l ligand per mg/g elemental precious metal/s.

33. A process as claimed in claim 1, wherein the substituted dithiooxamide ligand is a compound represented by Formula 1:

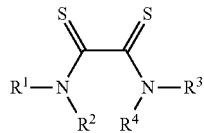

where R1,2,3,4 are independently —H, alkyl, substituted alkyl, aryl, or substituted aryl; or Formula 2:

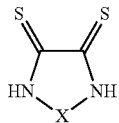

where X is —CO—, —CS—, —CH2-, —O—, —S—, —CH=CH—, or —NH—; or

Formula 3:

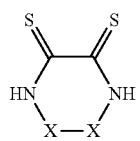

where X is —CO—, —CS—, —CH2-, —O—, —S—, or —NH—.

34. The method of claim 33, wherein the substituted dithiooxamide ligand is the compound represented by Formula 1:

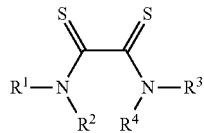

where R1,2,3,4 are independently —H, —COOH, —CH2COOH, or —(CH2)2SO3H.

* * * * *